J. W. IVORY.
FASTENING FOR ARTIFICIAL TEETH.
APPLICATION FILED JAN. 26, 1916.
1,186,989.
Patented June 13, 1916.
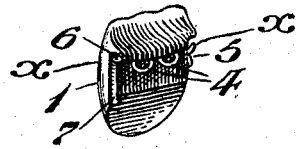
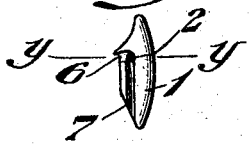
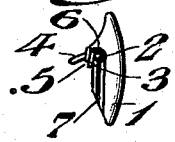
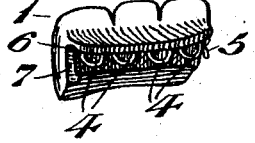
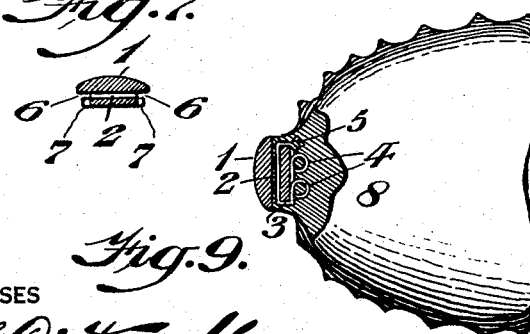
WITNESSES
INVENTOR
James W. Ivory.
BY
ATTORNEYS

UNITED STATES PATENT OFFICE.

JAMES W. IVORY, OF PHILADELPHIA, PENNSYLVANIA.

FASTENING FOR ARTIFICIAL TEETH.

1,186,989.  Specification of Letters Patent.  Patented June 13, 1916.

Application filed January 26, 1916. Serial No. 74,308.

*To all whom it may concern:*

Be it known that I, JAMES W. IVORY, a subject of the King of Great Britain, residing in the city and county of Philadelphia, State of Pennsylvania, have invented a new and useful Fastening for Artificial Teeth, of which the following is a specification.

My invention consists of a device for fastening an artificial tooth to a mouth plate, the same embodying one or more eyes on a limb of a loop or similar shaped wire member composed of parallel or comparatively parallel lengths or branches the other limb of which is adapted to enter the tooth so as to be secured thereto, leaving said eye or eyes on the exterior of the latter to receive the plate material and be embedded in the same, said material being also adapted to occupy recesses in the tooth, thus most firmly mounting the tooth on the plate.

The invention is satisfactorily illustrated in the accompanying drawing, but the important instrumentalities thereof may be varied, as long as they are included in the scope of the claims.

Figures 1 and 8 represent perspective views of fastenings for artificial teeth in primary condition embodying my invention. Figs. 2, 10 and 11 represent perspective views with the fastening in position on the tooth. Fig. 3 represents a side elevation of the device shown in Fig. 2. Fig. 4 represents a horizontal section on the line $x$—$x$ Fig. 2, on a reduced scale. Fig. 5 represents a side elevation of the tooth, the fastening being removed therefrom. Fig. 6 represents a rear elevation of the tooth on the scale of Fig. 2. Fig. 7 represents a section on line $y$—$y$ Fig. 5. Fig. 9 represents a partial plan view and partial horizontal section of the device.

Similar numerals of reference indicate corresponding parts in the figures.

Referring to the drawings, 1 designates an artificial tooth in which in the biting portion thereof is the aperture or opening 2, the same extending entirely through the tooth, in the direction of the width thereof.

3 designates a loop which is formed of a piece of suitable wire of parallel or comparatively parallel lengths or branches, one of the limbs thereof having thereon the eyes 4 bent out therefrom midway of its ends, the other limb or length of which being passed through the aperture 2 in the tooth, and the first named length is placed on the posterior wall of the tooth back of said aperture leaving the eyes 4 projecting rearwardly therefrom.

The ends of the loop are brought together and bent and united by twists 5 of said ends, or other means, whereby the loop is secured to the tooth, and the eyes are firmly retained in position for connection with the mouth plate therewith, the material of said plate inclosing the eyes and entering the openings in the same, it being evident that the eyes and portions of the loop exterior of the tooth are embedded in the material of the plate, thus most firmly connecting the tooth with said plate.

In the sides of the tooth adjacent to the terminals of the aperture 2 are the inwardly extending notches or recesses 6, in which the adjacent bends of the wire of the loop 3 are seated, avoiding protrusion of said portions of the wire and of the twisted ends 5 thereof beyond the extreme side edges of the tooth on the lingual face of the latter, and thus the adjacent teeth may be set close together without obstruction by the loop at the bend and fastenings.

In the sides of the tooth on the lateral wall thereof are the recesses 7 which extend from the notches 6 to the inwardly-extending notches 8 in the ridge lap of the tooth. These recesses 7 and the notches 6 and 8 in the tooth, at the terminals of said recesses 7, form undercuts which receive adjacent portions of the plate material, and cause the latter to interlock therewith, forming strong connections of the tooth and plate on various portions of the tooth, viz., the notches 6 and 8 and recesses 7, this being further assisted by some of the plate material entering through said notches into the aperture or opening 2, and flowing around the portion of the wire or limb of the loop 3 therein.

The number of eyes on the loop may be varied. In Figs. 1, 2, and 4, I show two of the same, and in Fig. 8, I show a single eye, but, of course, a larger number of eyes may be formed on the loop if so desired, such as for molar teeth, as in Fig. 10, or for a gum section of two or more teeth, as in Fig. 11.

The operation is as follows:—The porcelain body for the tooth is molded in a suitable mold forming the tooth with the undercut recesses 7 in its lateral sides and its notches 6. The tooth is biscuited and the aperture 2 is molded in or afterward drilled into the same. The tooth thus biscuited and drilled is now placed in a furnace and fused. One end of the wire fastener is passed through the aperture 2 in the fused tooth leaving the eyes of the wire extend at an angle inward and downward from the back of the tooth, just under the biting edge. The free end of the wire that is passed through said aperture is now joined to the other free end of the same beyond the eyes 4 and the ends of the wires are twisted together tightening the wire to the tooth, and the end bands of the wire extend into the notches 6 to the depth of the diameter of the wire. The tooth or teeth thus formed are waxed and fitted to a dental model, the wax entering the recesses 7, and notches 6 and aperture of the tooth and covering the wire and molding the denture for the mouth.

Having thus described my invention what I claim as new and desire to secure by Letters Patent, is:—

1. In a fastening for an artificial tooth, a loop like member of parallel or comparatively parallel limbs and having an eye on one of the limbs bent therefrom midway of its ends.

2. A fastening for an artificial tooth consisting of a loop-like member of parallel or comparatively parallel limbs, one limb of which is adapted to be inserted in the tooth, and the other limb is provided with an eye midway of its ends adapted to occupy a projecting position on the exterior of the rear of the tooth, the terminals of the limbs of said member being connected.

3. In a fastening for an artificial tooth providing the latter with an opening therethrough in the direction of the width thereof, inwardly extending recesses in the sides of the tooth at the terminals of said opening, and a loop like member having a limb adapted to occupy said opening, and the other limb provided with an eye adapted to occupy a projecting position on the exterior of the rear of the tooth, the bends of said member being adapted to be seated in said recesses.

4. In a fastening for an artificial tooth providing the latter with an opening therethrough in the biting portion thereof in the direction of the width thereof, inwardly extending recesses in the sides of the tooth at the terminals of said opening, inwardly-extending recesses in the sides of the ridge lap of the tooth, and recesses in the sides of the tooth joining the recesses in said biting portion of the tooth and those in the ridge lap and a loop-like member having a limb in said opening and its bends occupying said inwardly extending recesses at said terminal, and its other limb provided with an eye midway of its end adapted to occupy a projecting position on the exterior of the rear of the tooth, the material of the plate being adapted to occupy the said inwardly extending recesses in the biting portion and the lap ridge of the tooth and the side recesses that join the said recesses and enter the opening in said portion and close around the limb therein and enter and close around said eye.

JAMES W. IVORY.

Witnesses:
JOHN A. WIEDERSHEIM,
M. E. BYRNE.

Copies of this patent may be obtained for five cents each, by addressing the "Commissioner of Patents, Washington, D. C."